US006881471B2

(12) United States Patent  
Toussant et al.

(10) Patent No.: US 6,881,471 B2  
(45) Date of Patent: *Apr. 19, 2005

(54) HIGH SPEED EMBOSSING AND ADHESIVE PRINTING PROCESS AND APPARATUS

(75) Inventors: John William Toussant, West Chester, OH (US); Kenneth Stephen McGuire, Sharonville, OH (US); Stephan Gary Bush, Cincinnati, OH (US); Donald A. Salsman, West Chester, OH (US); Jeffrey Moss Vaughn, Cincinnati, OH (US); Kevin Benson McNeil, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 484 days.

This patent is subject to a terminal disclaimer.

(21) Appl. No.: 10/150,258

(22) Filed: Oct. 25, 2001

(65) Prior Publication Data

US 2004/0091701 A1 May 13, 2004

(51) Int. Cl.⁷ .............................. B05D 5/10; B32B 3/00
(52) U.S. Cl. ................. 428/172; 427/208.2; 427/208.4; 427/277
(58) Field of Search .......................... 427/208.2, 208.4, 427/208.6, 256, 288, 277, 428; 428/172

(56) References Cited

U.S. PATENT DOCUMENTS

| 2,338,749 A | 1/1944 | Wilbur |
| 2,861,006 A | 11/1958 | Salditt |
| 3,312,005 A | 4/1967 | McElroy |
| 3,386,846 A | 6/1968 | Lones |
| 3,554,835 A | 1/1971 | Morgan |
| 3,592,722 A | 7/1971 | Morgan |
| 3,671,284 A * | 6/1972 | Uhrig .......................... 427/194 |
| 3,853,129 A | 12/1974 | Kozak |
| 3,879,330 A | 4/1975 | Lustig |
| 3,901,237 A | 8/1975 | Cepuritis et al. |
| 3,937,221 A | 2/1976 | Tritsch |
| 3,943,609 A | 3/1976 | Egan, Jr. |
| 3,967,624 A | 7/1976 | Milnamow |
| 4,023,570 A | 5/1977 | Chinai et al. |
| 4,054,697 A | 10/1977 | Reed et al. |
| 4,061,820 A | 12/1977 | Magid et al. |
| 4,067,337 A | 1/1978 | Ness |
| 4,133,152 A | 1/1979 | Penrose |
| 4,181,752 A | 1/1980 | Martens et al. |
| 4,273,889 A | 6/1981 | Yamazaki et al. |
| 4,303,485 A | 12/1981 | Levens |
| 4,336,804 A | 6/1982 | Roeder |

(Continued)

FOREIGN PATENT DOCUMENTS

| BE | 570960 | 9/1958 |
| EP | 0037101 A1 | 10/1981 |
| EP | 0 621 082 A1 | 10/1994 |

(Continued)

OTHER PUBLICATIONS

Watson, D.F., "Computing the n–dimensional Delaunay Tessellation with Application to Voronoi Polytopes", The Computer Journal, vol. 24, No. 2, pp. 167–172 (1981).

(Continued)

*Primary Examiner*—Fred J. Parker  
(74) *Attorney, Agent, or Firm*—Peter D. Meyer

(57) ABSTRACT

A high speed embossing and adhesive printing process using a first and second embossing rolls having complementary embossing pattern disposed thereon. A web of sheet material is placed in contact with an adhesive applied to the first embossing roll. The adhesive forms an adhesive pattern on the web of sheet material in register with the first embossing pattern of the first embossing roll. The web of sheet material is then passed between the first and second embossing rolls which emboss the web with the complementary embossing pattern.

19 Claims, 5 Drawing Sheets

U.S. PATENT DOCUMENTS

| | | |
|---|---|---|
| 4,337,772 A | 7/1982 | Roeder |
| 4,339,088 A | 7/1982 | Niedermeyer |
| 4,342,314 A | 8/1982 | Radel et al. |
| 4,376,440 A | 3/1983 | Whitehead et al. |
| 4,392,897 A | 7/1983 | Herrington |
| 4,397,905 A | 8/1983 | Dettmer et al. |
| 4,404,242 A | 9/1983 | Squier |
| 4,405,666 A | 9/1983 | Squier |
| 4,410,130 A | 10/1983 | Herrington |
| 4,460,634 A | 7/1984 | Hasegawa |
| 4,508,256 A | 4/1985 | Radel et al. |
| 4,509,908 A | 4/1985 | Mullane, Jr. |
| 4,514,345 A | 4/1985 | Johnson et al. |
| 4,519,095 A | 5/1985 | Clayton |
| 4,528,239 A | 7/1985 | Trokhan |
| 4,546,029 A | 10/1985 | Cancio et al. |
| 4,556,595 A | 12/1985 | Ochi |
| 4,576,850 A | 3/1986 | Martens |
| 4,578,069 A | 3/1986 | Whitehead et al. |
| 4,587,152 A | 5/1986 | Gleichenhagen et al. |
| 4,612,221 A | 9/1986 | Biel et al. |
| 4,655,761 A | 4/1987 | Grube et al. |
| 4,659,608 A | 4/1987 | Schulz |
| 4,695,422 A | 9/1987 | Curro et al. |
| 4,699,622 A | 10/1987 | Toussant et al. |
| 4,743,242 A | 5/1988 | Grube et al. |
| 4,778,644 A | 10/1988 | Curro et al. |
| 4,803,032 A | 2/1989 | Schulz |
| 4,820,589 A | 4/1989 | Dobreski et al. |
| 4,839,216 A | 6/1989 | Curro et al. |
| 4,894,275 A | 1/1990 | Pelzer |
| 4,946,527 A | 8/1990 | Battrell |
| 4,959,265 A | 9/1990 | Wood et al. |
| 5,008,139 A | 4/1991 | Ochi et al. |
| 5,080,957 A | 1/1992 | Leseman et al. |
| 5,098,522 A | 3/1992 | Smurkoski et al. |
| 5,112,674 A | 5/1992 | German et al. |
| 5,116,677 A | 5/1992 | Jones |
| 5,141,790 A | 8/1992 | Calhoun et al. |
| 5,165,982 A | 11/1992 | Gubitz et al. |
| D331,665 S | 12/1992 | Underhill |
| 5,175,049 A | 12/1992 | Huff et al. |
| 5,176,939 A | 1/1993 | Shepherd |
| 5,208,096 A | 5/1993 | Dohrer |
| 5,215,804 A | 6/1993 | Hagens et al. |
| 5,221,276 A | 6/1993 | Battrell |
| 5,245,025 A | 9/1993 | Trokhan et al. |
| 5,246,762 A | 9/1993 | Nakamura |
| 5,269,776 A | 12/1993 | Lancaster et al. |
| 5,273,809 A | 12/1993 | Simmons |
| 5,275,588 A | 1/1994 | Matsumoto et al. |
| 5,296,277 A | 3/1994 | Wilson et al. |
| 5,300,347 A | 4/1994 | Underhill et al. |
| 5,310,587 A | 5/1994 | Akahori et al. |
| 5,324,279 A | 6/1994 | Lancaster et al. |
| 5,334,428 A | 8/1994 | Dobreski et al. |
| 5,342,344 A | 8/1994 | Lancaster et al. |
| 5,344,693 A | 9/1994 | Sanders |
| 5,436,057 A | 7/1995 | Schulz |
| 5,453,296 A | 9/1995 | Lauritzen et al. |
| 5,458,938 A | 10/1995 | Nygard et al. |
| 5,487,929 A | 1/1996 | Rusincovitch, Jr. et al. |
| 5,512,122 A | 4/1996 | Sokyrka |
| 5,514,122 A | 5/1996 | Morris et al. |
| 5,518,801 A | 5/1996 | Chappell et al. |
| 5,527,112 A | 6/1996 | Dais et al. |
| D373,026 S | 8/1996 | Delebreau et al. |
| 5,575,747 A | 11/1996 | Dais et al. |
| 5,585,178 A | 12/1996 | Calhoun et al. |
| 5,589,246 A | 12/1996 | Calhoun et al. |
| 5,597,639 A | 1/1997 | Schulz |
| D381,810 S | 8/1997 | Schultz et al. |
| 5,662,758 A | 9/1997 | Hamilton et al. |
| 5,871,607 A | 2/1999 | Hamilton et al. |
| 5,965,235 A | 10/1999 | McGuire et al. |
| 6,193,918 B1 * | 2/2001 | McGuire et al. ............ 264/167 |
| 6,194,062 B1 | 2/2001 | Hamilton et al. |
| 6,277,226 B1 * | 8/2001 | Schulz ...................... 156/209 |

FOREIGN PATENT DOCUMENTS

| | | |
|---|---|---|
| EP | 0 623 332 A1 | 11/1994 |
| FR | 1 315 903 | 12/1962 |
| FR | 1429312 | 1/1966 |
| GB | 975783 | 11/1964 |
| GB | 1069445 | 5/1967 |
| JP | 03002292 A2 | 1/1991 |
| JP | 07246216 A2 | 9/1995 |
| WO | WO 92/00187 A1 | 1/1992 |
| WO | WO 95/11945 A1 | 5/1995 |
| WO | WO 95/31225 A1 | 11/1995 |
| WO | WO 96/31652 A1 | 10/1996 |
| WO | WO 96/41604 A1 | 12/1996 |
| WO | WO 97/18276 A1 | 5/1997 |
| WO | 0007532 * | 2/2000 |

OTHER PUBLICATIONS

Lim, J.H.F., et al., "Statistical Models to Describe the Structure of Porous Ceramic Membranes", Separation Science and Technology, 28 (1–3), pp. 821–854 (1993).

Broughton, J., et al., "Porous Cellular Ceramic Membranes: A Stochastic Model To Describe the Structure of an Anodic Oxide Membrane", Journal of Membrane Science 106, pp. 89–101 (1995).

Gardner, M., "Penrose Tiles to Trapdoor Ciphers", Penrose Tiling, Chapter 1, pp. 1–18.

U.S. Appl. No. 09/715,586, filed Nov. 17, 2000, Hamilton, et al.

U.S. Appl. No. 09/716,542, filed Nov. 20, 2000, Hamilton, et al, Abandoned.

U.S. Appl. No. 09/716,740, filed Nov. 20, 2000, Hamilton, et al.

U.S. Appl. No. 09/718,686, filed Nov. 22, 2000, O'Brien, et al.

* cited by examiner

US 6,881,471 B2

HIGH SPEED EMBOSSING AND ADHESIVE PRINTING PROCESS AND APPARATUS

FIELD OF THE INVENTION

The present invention relates to processes and equipment for embossing and applying an adhesive to a sheet of web material.

BACKGROUND OF THE INVENTION

Three-dimensional sheet materials which include a thin layer of pressure-sensitive adhesive protected from inadvertent contact, as well as methods and apparatus for manufacturing them, have been developed and are described in detail in commonly-assigned patents, namely, Hamilton et al., U.S. Pat. No. 5,662,758, entitled "Composite Material Releasably Sealable to a Target Surface When Pressed Thereagainst and Method of Making", Hamilton et al., U.S. Pat. No. 5,871,607, entitled "Material Having A Substance Protected by Deformable Standoffs and Method of Making", McGuire et al., U.S. Pat. No. 5,965,235, entitled "Three-Dimensional, Nesting-Resistant Sheet Materials and Method and Apparatus for Making Same", and Hamilton et al., U.S. Pat. No. 6,194,062, entitled "Improved Storage Wrap Materials" and McGuire et al., U.S. Pat. No. 6,193,918, entitled "High Speed Embossing and Adhesive Printing Process and Apparatus", all of which are hereby incorporated herein by reference.

While the processes and equipment for manufacturing such pressure sensitive, adhesive-coated materials described in these patents are suitable for manufacturing, the nature of the processes and equipment can be sensitive to machine set-up. Said differently, the maximum speed at which such processes and equipment can be operated to produce materials can be limited by the size or weight of moving components, machine set-up, the rate at which heat can be applied to deformable substrate materials, the rate at which forces can be imparted to the substrate to deform it into the desired configuration, and/or the rate at which adhesive can be applied to the substrate and/or intermediate apparatus elements. The speed at which such processes and apparatus can be operated is a major factor in the economics of producing such materials on a commercial scale.

Accordingly, it would be desirable to provide an improved process and apparatus suitable for forming adhesive-coated, three-dimensional sheet materials by applying adhesive at higher speeds than previously disclosed.

It would also be desirable to provide the ability to separately control both the embossing and printing steps of the overall manufacturing process. This separation of the embossing and printing steps can extend the life of an engraved embossing roll, and can result in a better quality embossed pattern as the embossing roll performs only an embossing step rather than an embossing and printing step.

SUMMARY OF THE INVENTION

The present invention encompasses a method for a high speed embossing and adhesive printing process. The process comprises the steps of first supplying a first embossing roll having a first embossing pattern disposed thereon. The first embossing roll is engaged with a second embossing roll that has a second embossing pattern disposed thereon. The first embossing pattern and the second embossing pattern are complementary. Next, an adhesive is applied to the first embossing roll. Then, a web of sheet material is contacted with the first embossing roll after applying the adhesive to the first embossing roll so that the adhesive forms an adhesive pattern on the web of sheet material in register with the first embossing pattern of the first embossing roll. Finally, the web of sheet material is passed between the first embossing roll and the second embossing roll so that the first embossing roll and the second embossing roll emboss the web with the complementary embossing pattern.

Alternatively, the present invention also encompasses a high speed embossing and adhesive printing process comprising the steps of first supplying a first embossing roll with a first embossing pattern having lands and recesses disposed thereon. The first embossing roll is engaged with a second embossing roll having a second embossing pattern disposed thereon. The first embossing pattern and the second embossing pattern are complementary. Next a web of sheet material is passed between the engagement of the first embossing roll and the second embossing roll so that the first embossing roll and the second embossing roll emboss the web of sheet material with the complementary embossing pattern. Finally, an adhesive is applied to the sheet of web material.

The present invention also relates to an adhesive coated sheet material which comprises an adhesive deposited on a web of sheet material by supplying a first embossing roll having a first embossing pattern disposed thereon. The first embossing roll is engaged with a second embossing roll having a second embossing pattern disposed thereon. The first embossing pattern and the second embossing pattern are complementary. The adhesive is applied to the first embossing roll. The web of sheet material is then contacted with the first embossing roll, so that the adhesive forms an adhesive pattern on the web of sheet material in register with the first embossing pattern of the first embossing roll. The web of sheet material is then passed between the first embossing roll and the second embossing roll so that the first embossing roll and the second embossing roll emboss the web with the complementary embossing pattern.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
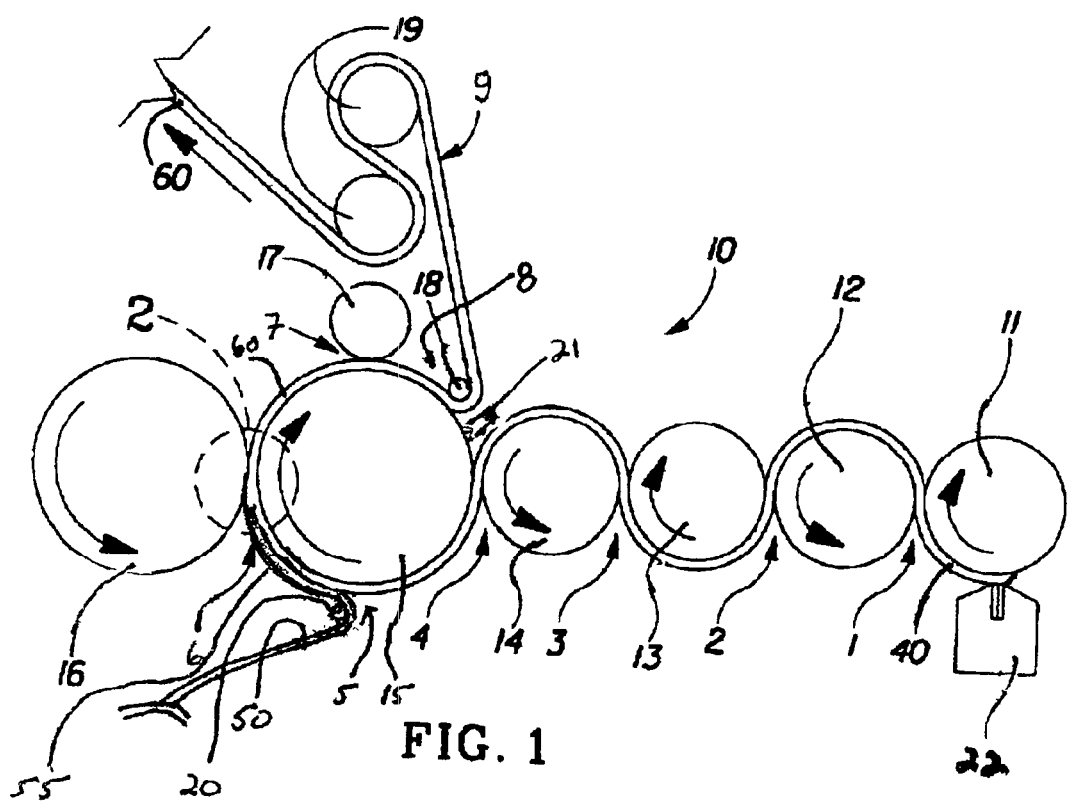
FIG. 1 is a schematic illustration of an embossing and adhesive printing process and apparatus according to the present invention.
Figure 2:
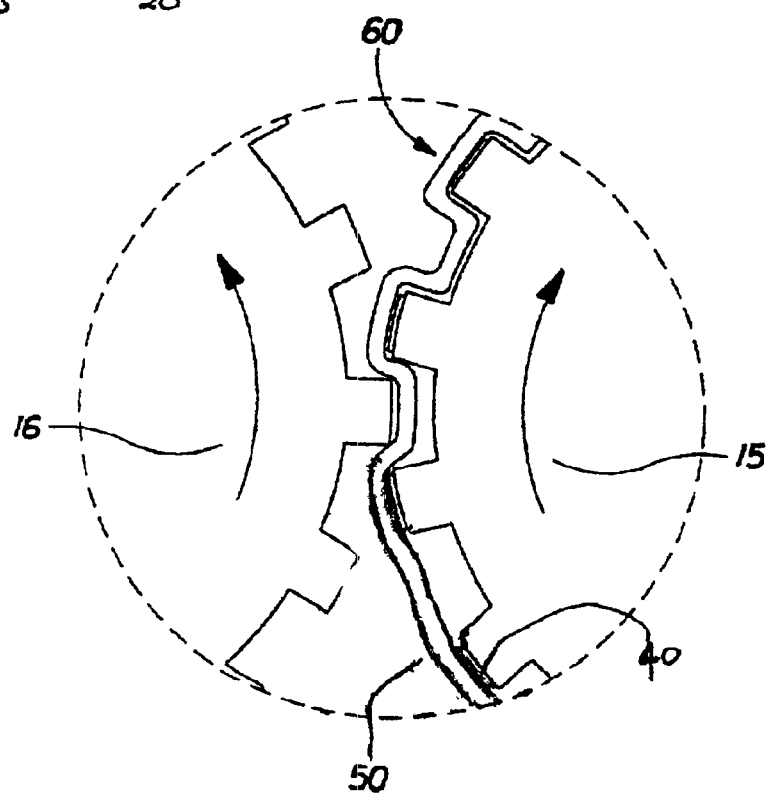
FIG. 2 is an enlarged partial view of the apparatus of the region labeled 2 of FIG. 1 illustrating the in-register embossing step between the embossing rolls.

FIG. 1 illustrates in schematic form, a high speed embossing process and high speed embossing apparatus 10 of the present invention. The high speed embossing apparatus 10 comprises first and second embossing rolls 15, 16, a plurality of adhesive metering application rolls 11–14, a web transfer roll 20, a pressure roll 17, a strip-off roll 18, and an S-wrap 19. The first and second embossing rolls 15, 16 have a complementary (i.e., matched) embossing pattern which interlocks to emboss the pattern onto a web of sheet material 50 passed therebetween. The embossing roll provided with pockets and raised lands is generally referred to as the female embossing roll. The embossing roll with raised nubs and recessed lands is generally referred to as the male embossing roll. It will be understood that either the first or second embossing roll 15, 16 can be the male or female roll. As a non-limiting example, if the first embossing roll 15 is determined to be the female roll, then the second embossing roll 16 should be the male roll. It is preferred that the first embossing roll 15 have a release surface, such as a silicone-based or a fluorocarbon-based material (i.e. FEP), disposed thereon. The release surface generally has a high release characteristic to facilitate removal of the embossed final product from the first embossing roll.

As shown in FIG. 1, the high speed embossing apparatus will typically comprise a plurality of adhesive application metering rolls 11–14 that generally supply a metered amount of adhesive 40 to first embossing roll 15 from an adhesive supply. The surfaces of adhesive application metering rolls 11–14 preferably have alternating surface coatings. As a non-limiting example, first adhesive application metering roll 11 can be steel and adjacent adhesive application metering roll 12 can be rubber-coated or other conformable surface. Although numerous configurations are possible, it is preferred that every other roll of the plurality of adhesive application metering rolls 11–14 have a conformable surface.

The surfaces of pressure roll 17 and strip off roll 18 are preferably rubber-coated. The S-wrap 19 can comprise a plurality of hollow steel rolls. It is preferred that each roll of S-wrap 19 have a release coating applied thereon, however, it would be known to those of skill in the art that a release coating may not be necessary. It is also preferred that S-wrap 19 be chilled with a supplied coolant that flows through any individual roll of S-wrap 19. FIG. 1 depicts with arrows, an exemplary and non-limiting, direction of roll rotation for each roll.

More specifically, with reference to FIG. 1, an adhesive 40 is extruded onto the surface of the first adhesive application metering roll 11 via a slot die 22. Exemplary, but non-limiting adhesives include hot melt-, pressure sensitive-, water based-, water borne-solvent based-, ultraviolet- and e-beam cured adhesives, and combinations thereof. It is also preferred that slot die 22 be heated and supplied by a hot melt supply system, which can include a heated hopper and variable speed gear pump (not shown) through a heated hose. However, it would be known to one of skill in the art that other methods to supply an adhesive 40 to first adhesive application metering roll 11 can be used.

The surface speed of the first adhesive application metering roll 11 is generally considerably slower than the nominal tangential line speed of the web of sheet material 50 to be embossed and coated. The metering nips are shown in FIG. 1 as stations 1, 2, and 3. The remaining adhesive application metering rolls 12–14 then rotate progressively faster so that the adhesive application nip, station 4, is surface speed matched with the surface speed of traversing web of sheet material 50. The adhesive 40 is then transferred from the final adhesive application metering roll 14 to the first embossing roll 15, located at station 4. The adhesive 40 travels on the surface of first embossing roll 15 to station 5, where adhesive 40 is combined with the web of sheet material 50 to form adhesive coated web 55. The adhesive coated web 55 then proceeds to station 6.

At station 6, the adhesive coated web 55 is embossed by first and second embossing rolls 15, 16 with the complementary embossing pattern thereon to form an embossed adhesive coated web 60. This results in the embossing pattern being in register with the adhesive pattern of first embossing roll 15. The embossed adhesive coated web 60, now adhered to the surface of the first embossing roll 15, next travels on the surface of first embossing roll 15 to station 7, where a pressure roll 17 applies pressure to the embossed adhesive coated web 60. The embossed adhesive coated web 60, still adhered to the first embossing roll 15, next travels to station 8, where it is removed from the first embossing roll 15 via strip-off roll 18. The finished embossed adhesive coated web 60 then travels to the S-wrap 19 at station 9. It is believed that cooling S wrap 19 increases the strength of the finished embossed adhesive coated web 60. As it would be known to one of skill in the art, the embossed adhesive coated web 60 can be further strengthened by supplying additional cooling to the embossed adhesive coated web 60 at stations 7 and 8.

Adhesive 40 is applied only to the land areas of the first embossing roll 15. This can be accomplished by carefully controlling the interaction between embossing roll 15 and final adhesive application roll 14 at station 4. The interaction between the first embossing roll 15 and the final adhesive application roll 14 should be controlled so that the final adhesive application roll 14 applies adhesive 40 to the lands of the first embossing roll 15 only, without pressing the adhesive 40 into the recesses or pockets between the lands of first embossing roll 15. For this reason, first embossing roll 15 and final adhesive application roll 14 should also have matched surface speeds. Deposition of adhesive 40 exclusively onto the lands of the first embossing roll 15 prevents adhesive 40 from being transferred onto the non-recessed regions of the embossments in the finished embossed adhesive coated web 60. Adhesive present on the tops of the embossments could cause premature exhibition of adhesive properties prior of the activation of the final product via crushing of the embossments.

For exemplary purposes only, final adhesive application roll 14 can be a rubber coated steel roll. The rubber coating should have approximately 0.001 inches (0.025 mm) TIR runout tolerance. The nip between final adhesive application roll 14 and first embossing roll 15 is controlled in the machine direction with precision wedge blocks. It is believed that a rubber coating can be utilized to both protect the coating on the metal first embossing roll 15 from damage due to metal-to-metal contact and also allow the final adhesive application roll 14 to be very lightly pressed against the first embossing roll 15 so the deflection of the rubber compensates for the actual runout of the first embossing roll 15 and the final adhesive application roll 14. In the alternative, it is preferred that first embossing roll 15 exhibit conformable characteristics and that final adhesive application roll 14 exhibit non-conformable characteristics. This allows adhesive 40 to be applied evenly on the lands of first embossing roll 15. However, it would be known to one of skill in the art that either first embossing roll 15 or final adhesive application roll 14 can be any arrangement of conformable/non-conformable as long as adhesive 40 is provided in a topically efficacious manner.

The adhesive 40 utilized should preferably be highly elastic in nature because a transition from a stationary slot die 22 to full tangential line speed can result in the adhesive 40 being extended and fractured, or in non-adhesion to the first adhesive application metering roll 11. As would be known of one of skill in the art, adhesive 40 can generally be a styrenated block-copolymer, such as X801-334-03 manufactured by the Bostik Findlay Corporation, Wawatoss, Wis. To reduce the extension rate of the adhesive, the adhesive 40 is preferably first applied to a roll having a surface speed lower than the speed of the moving web of sheet material 50 and then through a series of metering nips (stations 1, 2, and 3) until adhesive 40 is milled to a very thin film and accelerated at the desired tangential line speed.

It has been discovered that low adhesive thickness is preferred because the process is less prone to adhesive build up and manufacturing ineffiencies associated with adhesive build up. Surprisingly, good tack in the final finished product, in use, is maintained at even low glue thicknesses. A further benefit of reduced adhesive is the lower cost of purchased material and added inventory costs. An additional product benefit is that there is less stray adhesive in the product which tends to stick the layers together in a roll and making the product more difficult for the consumer to unwind.

Preferably, the adhesive thickness ranges from about 0.0003 inches (0.008 mm) to about 0.00001 inches (0.00025 mm). More preferably, the adhesive thickness ranges from about 0.0002 inches (0.005 mm) to about 0.00003 inches (0.0007 mm). Most preferably, the adhesive thickness ranges from about 0.00015 inches (0.004 mm) to about 0.00005 inches (0.0013 mm). Further, it is believed that adhesive 40 should be applied to the web of sheet material 50 at a basis weight of less than 3 g/m$^2$, and most preferably less than 2 g/m$^2$. The application of adhesive 40 to the web of sheet material 50 is further disclosed in concurrently filed and co-pending application Ser. No. 10/003,900, entitled "Storage Wrap Material," herein incorporated by reference. The adhesive application metering rolls 11–14 should be ground to exacting tolerances for diameter and runout to maintain the precise inter-roll gap dimensions required for adhesive metering and acceleration. Typical runout tolerance is 0.0005 inches (0.013 mm) TIR. The adhesive application metering rolls 11–14, as well as first and second embossing rolls 15, 16, can be heated uniformly circumferentially and across the machine direction to avoid thermally-induced crown or runout of the rolls. It has been found that, in the case of electrically heated rolls, a single heater failure can create enough runout to prevent uniform adhesive printing onto the web of sheet material 50. In such a case, ammeters should used to indicate heater failures. Additionally, heat loss through bearings and roll shafts can create roll crown, which can also prevent uniform adhesive 40 printing. For this reason, the bearing blocks of adhesive application metering rolls 11–14 are preferably heated to prevent temperature gradients in the cross machine direction.

The first embossing roll 15 preferably has release characteristics on the land surfaces and preferably the surfaces of the pockets or recesses therebetween. The release characteristics and the adhesive 40 properties should be carefully balanced to provide the best combination of adhesion and release. An exemplary release characteristic would be a coating which allows a very hot (typically 300–350° F. (149–177° C.)) adhesive to transfer to the first embossing roll 15 and yet allow the embossed adhesive coated web 60 to release at the first embossing roll 15 temperature. If the release characteristic promotes too little adhesion, the adhesive will not transfer from the final adhesive application roll 14 to the first embossing roll 15. However, if the release characteristic promotes too much adhesion, the final adhesive coated web 60 cannot be removed from the surface of the first embossing roll 15 without tearing or stretching the web of sheet material 50.

In one exemplary embodiment, the first embossing roll 15 is internally cooled to a temperature that facilitates release of the adhesive-coated web from the embossing roll 15. In order to improve adhesive transfer from the adhesive application roll 14 to the embossing roll 15, the surface of the embossing roll 15 between station 8 and station 4 should be heated by heater 21. Heaters would be known to one skilled in the art to include radiant, conductive, convective, and combinations thereof. Alternately, these results could be achieved by heating the embossing roll 15 and then selectively cooling the embossed adhesive coated web 60 between station 6 and station 8. Preferably, the embossed adhesive coated web 60 temperature is cooled at station 8 to less than 180° F. (82° C.), more preferably less than 140° F. (60° C.), and most preferably, less than 100° F. (38° C.). In sum, a temperature differential should exist between the point of adhesive 40 pick-up at station 4 and the point of embossed adhesive coated web 60 removal from the first embossing roll 15 at station 8. Preferably, the surface temperature of first embossing roll 15 at station 8 is lower than the surface temperature of first embossing roll 15 at station 4.

The strip-off roll 18 assists in removing the embossed adhesive coated web 60 from the first embossing roll 15 without damaging the embossed adhesive coated web 60. Since the embossed adhesive coated web 60 is adhered to the surface of the first embossing roll 15, very high forces can be developed at the removal point. Without wishing to be bound by theory, it is believed that strip-off roll 18 localizes these high forces to a very short length of embossed adhesive coated web 60, resulting in less distortion of the embossed adhesive coated web 60 and more control over the strip-off angle. Preventing distortion of the embossed adhesive coated web 60 is essential to provide consistent web properties and prevent the embossed adhesive coated web 60 from having regions which are prematurely activated to exhibit the applied adhesive properties.

The amount or degree of engagement between the first and second embossing rolls 15, 16 should be carefully controlled to prevent damage to the rolls or to the web of sheet material 50. The outside surfaces of the first and second embossing rolls 15, 16 are typically ground to a 0.0005 inch (0.013 mm) TIR runout tolerance. The engagement can be controlled in the machine direction with precision wedge blocks. The engagement of the first and second embossing rolls 15, 16 governs the final caliper of the embossed adhesive coated web 60 (i.e., the final height of the embossments and the thickness of the web). The equipment should also be designed so as to maintain precise synchronization, or registration, of the first and second embossing rolls 15, 16.

The use of mating male and female embossing rolls of complementary pattern shapes can fully support a thin film web of sheet material 50 during the embossing and adhesive application process step to ensure that the forces are properly distributed within the web of sheet material 50. Full support of the web of sheet material 50, as opposed to thermoforming or vacuum forming a web of sheet material 50 with an open support structure such as an apertured belt or drum wherein the portion of the web of sheet material 50 is deformed into the apertures or recesses is unsupported, is believed to allow an increase in the rate at which strains are imparted to the web of sheet material 50 without damage to the web of sheet material 50 thus allowing for higher production speeds. The application of the adhesive 40 to the web of sheet material 50 on the first embossing roll 15 provides precise registration of the adhesive 40 on the portions of the web of sheet material 50 over the land areas of the first embossing roll 15.

Precise control over the adhesive 40, particularly the thickness and uniformity of the adhesive layer applied to the first embossing roll 15, is an important factor in producing a high quality product at high speed. Especially in the case of very low add-on levels of adhesive 40, even slight variations in the thickness of the adhesive 40 during transfers from roll to roll can result in coverage gaps by the time the adhesive 40 is applied to the first embossing roll 15. At the same time, such variations can lead to excess adhesive 40 in certain regions of the first embossing roll 15 which could either contaminate the recesses in the first embossing roll 15 or result in incomplete adhesive 40 transfer to the web of sheet material 50 and a buildup of adhesive 40 on the first embossing roll 15.

Figure 3:
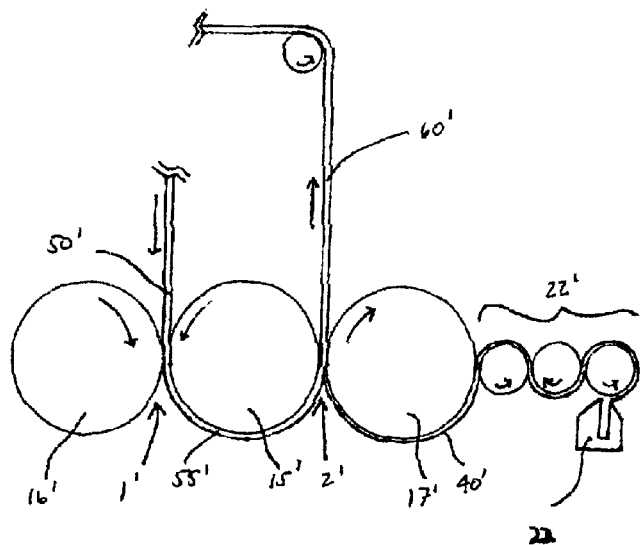
FIG. 3 is a schematic illustration of an alternative embossing and adhesive printing process and apparatus.

FIG. 3 shows an alternative process for high speed embossing. At station 1', a web of sheet material 50' is passed between first and second embossing rolls 15', 16', having complementary or mating embossing patterns, at a tangential line speed to form an embossed pattern on a web of sheet material 50'. The embossed web 55' is maintained on the first embossing roll 15'. At station 2', adhesive 40' is applied to the recesses of the embossed web 55'. The adhesive 40' is applied by a patterned adhesive application roll 17' having a complementary pattern to the embossed pattern of embossed web 55' and first embossing roll 15'. The patterned adhesive application roll 17' preferably has a release characteristic on all adhesive contacting surfaces. The adhesive coated and embossed web of sheet material 60' is then removed from between the first patterned adhesive roll 17' and the first embossing roll 15'.

The patterned adhesive application roll 17' is coated with adhesive, preferably from a multi-roll adhesive coater stack 22' and slot die 21', as described previously or by any other means known to those of skill in the art.

The alternative process for embossing and adhesive printing of FIG. 3 provides a benefit because the patterned adhesive application roll 17' is not required to perform an embossing function. Thus, the characteristics of patterned adhesive application roll 17' can be optimized for the application and release of adhesive 40' without regard to the impact on embossing. In particular, the patterned adhesive application roll 17' does not require a high tolerance fit with the first patterned embossing roll 15' nor is it exposed to the high pressures for embossing. Therefore, less strain results on the release surfaces resulting in longer life of the patterned adhesive application roll 17'.

Figure 4:
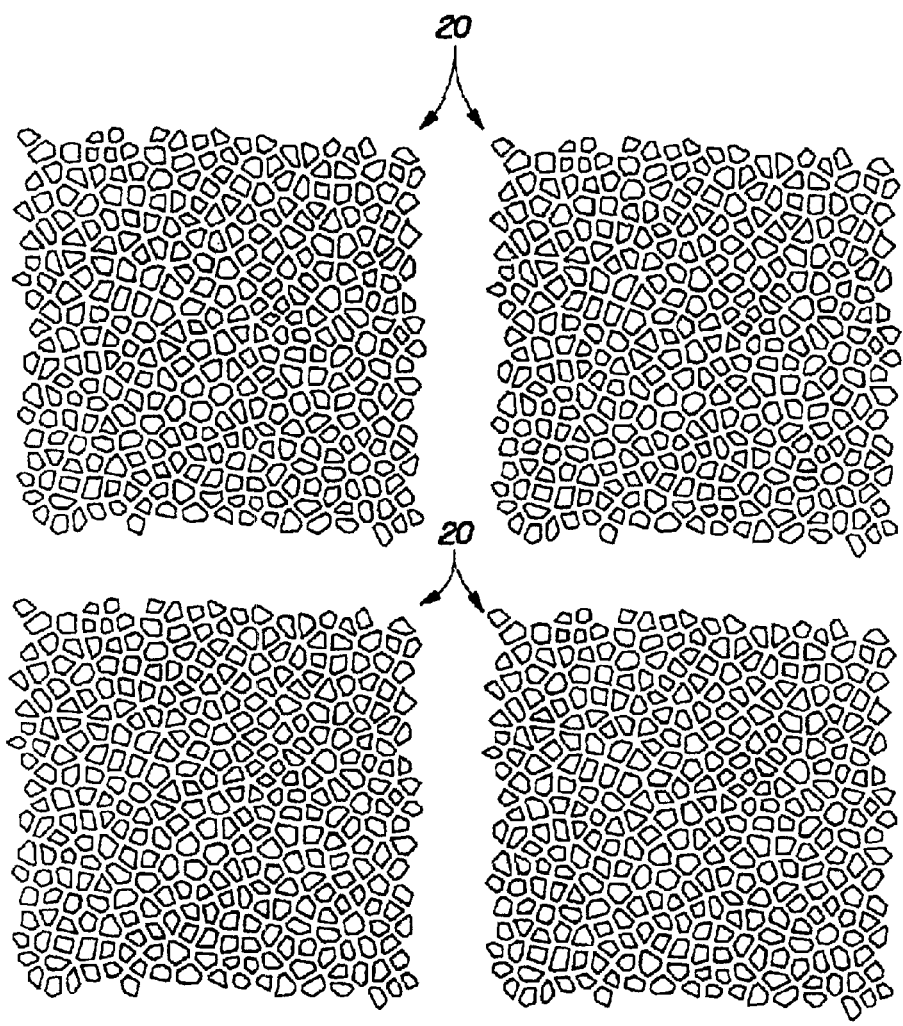
FIG. 4 is a plan view of four identical "tiles" of a representative embodiment of an amorphous pattern useful with the present invention.
Figure 5:
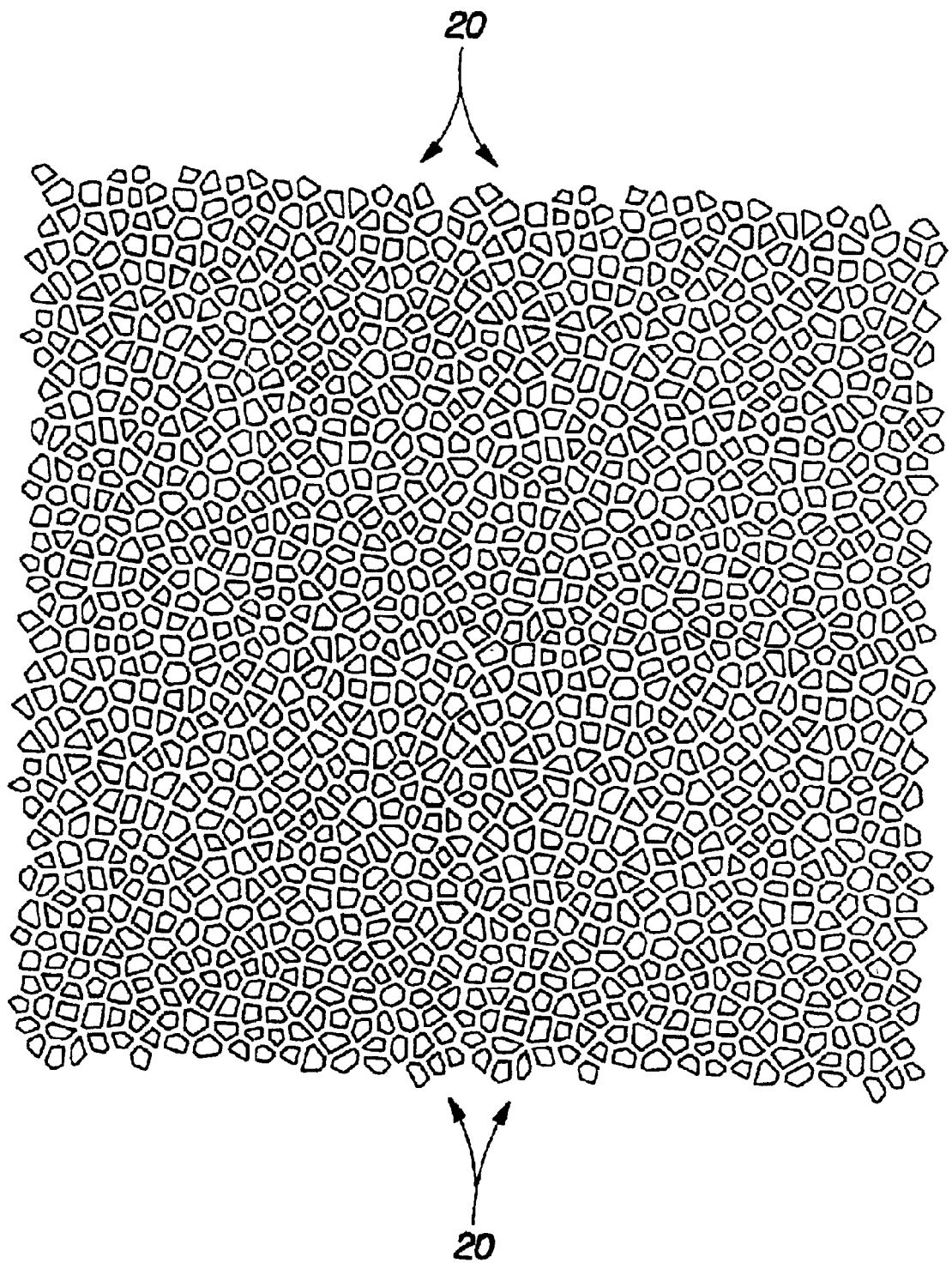
FIG. 5 is a plan view of the four "tiles" of FIG. 4 moved into closer proximity to illustrate the matching of the pattern edges.

An embossing pattern for the first and second embossing rolls 15, 16, as is shown in FIGS. 4 and 5, details a pattern 20 created using an algorithm described in greater detail in U.S. application Ser. No. 09/288,736, entitled "Method of Seaming and Expanding Amorphous Patterns", the disclosure of which is hereby incorporated herein by reference. FIGS. 4 and 5 show no appearance of a seam at the borders of the tiles 20 when they are brought into close proximity. Likewise, if opposite edges of a single pattern or tile were brought together, such as by wrapping the pattern around a belt or roll, the seam would likewise not be readily visually discernible.

As utilized herein, the term "amorphous" refers to a pattern which exhibits no readily perceptible organization, regularity, or orientation of constituent elements. This definition of the term "amorphous" is generally in accordance with the ordinary meaning of the term as evidenced by the corresponding definition in *Webster's Ninth New Collegiate Dictionary*. As would be known to one of skill in the art, in an amorphous pattern, the orientation and arrangement of one element with regard to a neighboring element has no predictable relationship to that of the next succeeding element(s).

The term "array" is utilized herein to refer to patterns of constituent elements which exhibit a regular, ordered grouping or arrangement. This definition of the term "array" is likewise generally in accordance with the ordinary meaning of the term as evidenced by the corresponding definition in *Webster's Ninth New Collegiate Dictionary*. In such an array pattern, the orientation and arrangement of one element with regard to a neighboring element bear a predictable relationship to that of the next succeeding element(s) beyond.

The degree to which order is present in an array pattern of three-dimensional protrusions bears a direct relationship to the degree of nestability exhibited by the web. For example, in a highly-ordered array pattern of uniformly-sized and shaped hollow protrusions in a close-packed hexagonal array, each protrusion is literally a repeat of any other protrusion. Nesting of regions of such a web, if not in fact the entire web, can be achieved with a web alignment shift between superimposed webs or web portions of no more than one protrusion-spacing in any given direction. Lesser degrees of order may demonstrate less nesting tendency, although any degree of order is believed to provide some degree of nestability. Accordingly, an amorphous, non-ordered pattern of protrusions would therefore exhibit the greatest possible degree of nesting-resistance.

Three-dimensional sheet materials having a two-dimensional pattern of three-dimensional protrusions which is substantially amorphous in nature are also believed to exhibit "isomorphism". As utilized herein, the terms "isomorphism" and its root "isomorphic" are utilized to refer to substantial uniformity in geometrical and structural properties for a given circumscribed area wherever such an area is delineated within the pattern. This definition of the term "isomorphic" is generally in accordance with the ordinary meaning of the term as evidenced by the corresponding definition in *Webster's Ninth New Collegiate Dictionary*. By way of example, a prescribed area comprising a statistically-significant number of protrusions with -regard to the entire amorphous pattern would yield statistically substantially equivalent values for such web properties as protrusion area, number density of protrusions, total protrusion wall length, etc. Such a correlation is believed desirable with respect to physical, structural web properties when uniformity is desired across the web surface, and particularly so with regard to web properties measured normal to the plane of the web such as crush-resistance of protrusions, etc.

Utilization of an amorphous pattern of three-dimensional protrusions has other advantages as well. For example, it has been observed that three-dimensional sheet materials formed from a material which is initially isotropic within the plane of the material remain generally isotropic with respect to physical web properties in directions within the plane of the material. As utilized herein, the term "isotropic" is utilized to refer to web properties which are exhibited to substantially equal degrees in all directions within the plane of the material. This definition of the term "isotropic" is likewise generally in accordance with the ordinary meaning of the term as evidenced by the corresponding definition in *Webster's Ninth New Collegiate Dictionary*. Without wishing to be bound by theory, this is presently believed to be due to the non-ordered, non-oriented arrangement of the three-dimensional protrusions within the amorphous pattern. Conversely, directional web materials exhibiting web properties which vary by web direction will typically exhibit such properties in similar fashion following the introduction of the amorphous pattern upon the material. By way of example, such a sheet of material could exhibit substantially uniform tensile properties in any direction within the plane of the material if the starting material was isotropic in tensile properties.

Such an amorphous pattern in the physical sense translates into a statistically equivalent number of protrusions per unit length measure encountered by a line drawn in any given direction outwardly as a ray from any given point within the pattern. Other statistically equivalent parameters could include number of protrusion walls, average protrusion area, average total space between protrusions, etc. Statistical equivalence in terms of structural geometrical features with regard to directions in the plane of the web is believed to translate into statistical equivalence in terms of directional web properties.

Revisiting the array concept to highlight the distinction between arrays and amorphous patterns, since an array is by definition "ordered" in the physical sense it would exhibit some regularity in the size, shape, spacing, and/or orientation of protrusions. Accordingly, a line or ray drawn from a given point in the pattern would yield statistically different values depending upon the direction in which the ray extends for such parameters as number of protrusion walls, average protrusion area, average total space between protrusions, etc. with a corresponding variation in directional web properties.

Within the preferred amorphous pattern, protrusions will preferably be non-uniform with regard to their size, shape, orientation with respect to the web, and spacing between adjacent protrusion centers. Without wishing to be bound by theory, differences in center-to-center spacing of adjacent protrusions are believed to play an important role in reducing the likelihood of nesting occurring in the face-to-back nesting scenario. Differences in center-to-center spacing of protrusions in the pattern result in the physical sense in the spaces between protrusions being located in different spatial locations with respect to the overall web. Accordingly, the likelihood of a "match" occurring between superimposed portions of one or more webs in terms of protrusions/space locations is quite low. Further, the likelihood of a "match" occurring between a plurality of adjacent protrusions/spaces on superimposed webs or web portions is even lower due to the amorphous nature of the protrusion pattern.

In a completely amorphous pattern, as would be presently preferred, the center-to-center spacing is random, at least within a designer-specified bounded range, such that there is an equal likelihood of the nearest neighbor to a given protrusion occurring at any given angular position within the plane of the web. Other physical geometrical characteristics of the web are also preferably random, or at least non-uniform, within the boundary conditions of the pattern, such as the number of sides of the protrusions, angles included within each protrusion, size of the protrusions, etc. However, while it is possible and in some circumstances desirable to have the spacing between adjacent protrusions be non-uniform and/or random, the selection of polygon shapes which are capable of interlocking together makes a uniform spacing between adjacent protrusions possible. This is particularly useful for some applications of the three-dimensional, nesting-resistant sheet materials of the present invention, as will be discussed hereafter.

As used herein, the term "polygon" (and the adjective form "polygonal") is utilized to refer to a two-dimensional geometrical figure with three or more sides, since a polygon with one or two sides would define a line. Accordingly, triangles, quadrilaterals, pentagons, hexagons, etc. are included within the term "polygon", as would curvilinear shapes such as circles, ellipses, etc. which would have an infinite number of sides.

When describing properties of two-dimensional structures of non-uniform, particularly non-circular, shapes and non-uniform spacing, it is often useful to utilize "average" quantities and/or "equivalent" quantities. For example, in terms of characterizing linear distance relationships between objects in a two-dimensional pattern, where spacings on a center-to-center basis or on an individual spacing basis, an "average" spacing term may be useful to characterize the resulting structure. Other quantities that could be described in terms of averages would include the proportion of surface area occupied by objects, object area, object circumference, object diameter, etc. For other dimensions such as object circumference and object diameter, an approximation can be made for objects which are non-circular by constructing a hypothetical equivalent diameter as is often done in hydraulic contexts.

A totally random pattern of three-dimensional hollow protrusions in a web would, in theory, never exhibit face-to-back nesting since the shape and alignment of each frustum would be unique. However, the design of such a totally random pattern would be very time-consuming and complex proposition, as would be the method of manufacturing a suitable forming structure. In accordance with the present invention, the non-nesting attributes may be obtained by designing patterns or structures where the relationship of adjacent cells or structures to one another is specified, as is the overall geometrical character of the cells or structures, but wherein the precise size, shape, and orientation of the cells or structures is non-uniform and non-repeating. The term "non-repeating", as utilized herein, is intended to refer to patterns or structures where an identical structure or shape is not present at any two locations within a defined area of interest. While there may be more than one protrusion of a given size and shape within the pattern or area of interest, the presence of other protrusions around them of non-uniform size and shape virtually eliminates the possibility of an identical grouping of protrusions being present at multiple locations. Said differently, the pattern of protrusions is non-uniform throughout the area of interest such that no grouping of protrusions within the overall pattern will be the same as any other like grouping of protrusions. The beam strength of the three-dimensional sheet material will prevent significant nesting of any region of material surrounding a given protrusion even in the event that that protrusion finds itself superimposed over a single matching depression since the protrusions surrounding the single protrusion of interest will differ in size, shape, and resultant center-to-center spacing from those surrounding the other protrusion/depression.

Professor Davies of the University of Manchester has been studying porous cellular ceramic membranes and, more particularly, has been generating analytical models of such membranes to permit mathematical modeling to simulate real-world performance. This work was described in greater detail in a publication entitled "Porous cellular ceramic membranes: a stochastic model to describe the structure of an anodic oxide membrane", authored by J. Broughton and G. A. Davies, which appeared in the *Journal of Membrane Science*, Vol. 106 (1995), at pp. 89–101, the disclosure of which is hereby incorporated herein by reference. Other related mathematical modeling techniques are described in greater detail in "Computing the n-dimensional Delaunay tessellation with application to Voronoi polytopes", authored by D. F. Watson, which appeared in *The Computer Journal*, Vol. 24, No. 2 (1981), at pp. 167–172, and "Statistical Models to Describe the Structure of Porous Ceramic Membranes", authored by J. F. F. Lim, X. Jia, R. Jafferali, and G. A. Davies, which appeared in *Separation Science and Technology*, 28(1–3) (1993) at pp. 821–854, the disclosures of both of which are hereby incorporated herein by reference.

As part of this work, Professor Davies developed a two-dimensional polygonal pattern based upon a constrained Voronoi tessellation of 2-space. In such a method, again with reference to the above-identified publication, nucleation points are placed in random positions in a bounded (pre-determined) plane which are equal in number to the number of polygons desired in the finished pattern. A computer program "grows" each point as a circle simultaneously and radially from each nucleation point at equal rates. As growth fronts from neighboring nucleation points meet, growth stops and a boundary line is formed. These boundary lines each form the edge of a polygon, with vertices formed by intersections of boundary lines.

While this theoretical background is useful in understanding how such patterns may be generated and the properties of such patterns, there remains the issue of performing the above numerical repetitions step-wise to propagate the nucleation points outwardly throughout the desired field of interest to completion. Accordingly, to expeditiously carry out this process a computer program is preferably written to perform these calculations given the appropriate boundary conditions and input parameters and deliver the desired output.

The first step in generating a pattern useful in accordance with the present invention is to establish the dimensions of the desired pattern. For example, if it is desired to construct a pattern 10 inches (25.4 cm) wide and 10 inches (25.4 cm) long, for optionally forming into a drum or belt as well as a plate, then an X-Y coordinate system is established with the maximum X dimension ($x_{max}$) being 10 inches (25.4 cm) and the maximum Y dimension ($y_{max}$) being 10 inches (25.4 cm) (or vice-versa).

Figure 6:
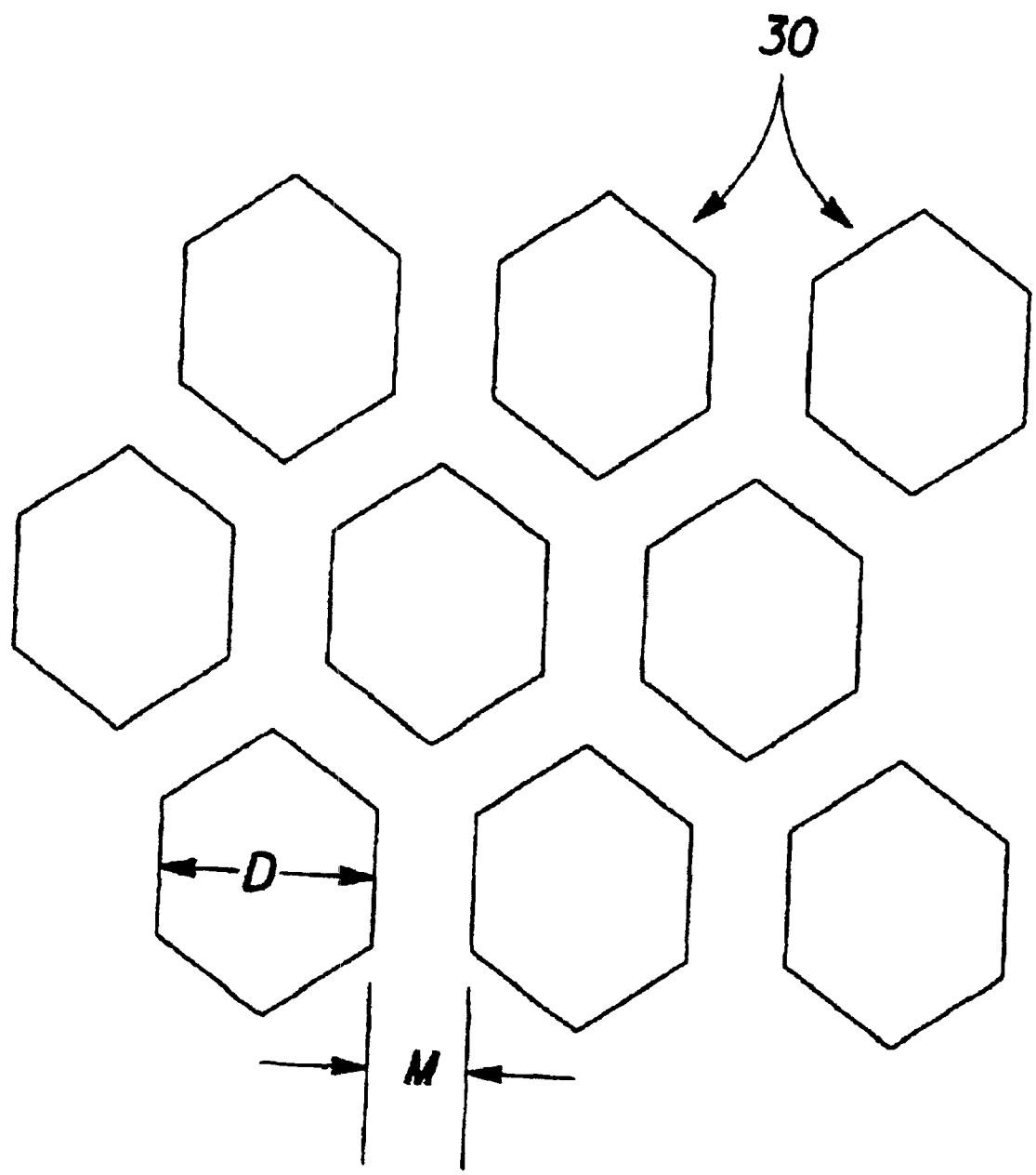
FIG. 6 is a schematic illustration of dimensions referenced in the pattern generation equations.

After the coordinate system and maximum dimensions are specified, the next step is to determine the number of "nucleation points" which will become polygons desired within the defined boundaries of the pattern. This number is an integer between 0 and infinity, and should be selected with regard to the average size and spacing of the polygons desired in the finished pattern. Larger numbers correspond to smaller polygons, and vice-versa. A useful approach to determining the appropriate number of nucleation points or polygons is to compute the number of polygons of an artificial, hypothetical, uniform size and shape that would be required to fill the desired forming structure. As shown in FIG. 6, if this artificial pattern is an array of regular hexagons 30, with D being the edge-to-edge dimension and M being the spacing between the hexagons, then the number density of hexagons, N, is:

$$N = \frac{2\sqrt{3}}{3(D+M)^2}$$

It has been found that using this equation to calculate a nucleation density for the amorphous patterns generated as described herein will give polygons with average size closely approximating the size of the hypothetical hexagons (D). Once the nucleation density is known, the total number of nucleation points to be used in the pattern can be calculated by multiplying by the area of the pattern (80 in$^2$ (516 cm$^2$) in the case of this example).

A random number generator is required for the next step. Any suitable random number generator known to those skilled in the art may be utilized, including those requiring a "seed number" or utilizing an objectively determined starting value such as chronological time. Many random number generators operate to provide a number between zero and one (0–1), and the discussion hereafter assumes the use of such a generator. A generator with differing output may also be utilized if the result is converted to some number between zero and one or if appropriate conversion factors are utilized.

A computer program is written to run the random number generator the desired number of iterations to generate as many random numbers as is required to equal twice the desired number of "nucleation points" calculated above. As the numbers are generated, alternate numbers are multiplied by either the maximum X dimension or the maximum Y dimension to generate random pairs of X and Y coordinates all having X values between zero and the maximum X dimension and Y values between zero and the maximum Y dimension. These values are then stored as pairs of (X,Y) coordinates equal in number to the number of "nucleation points".

Figure 7:
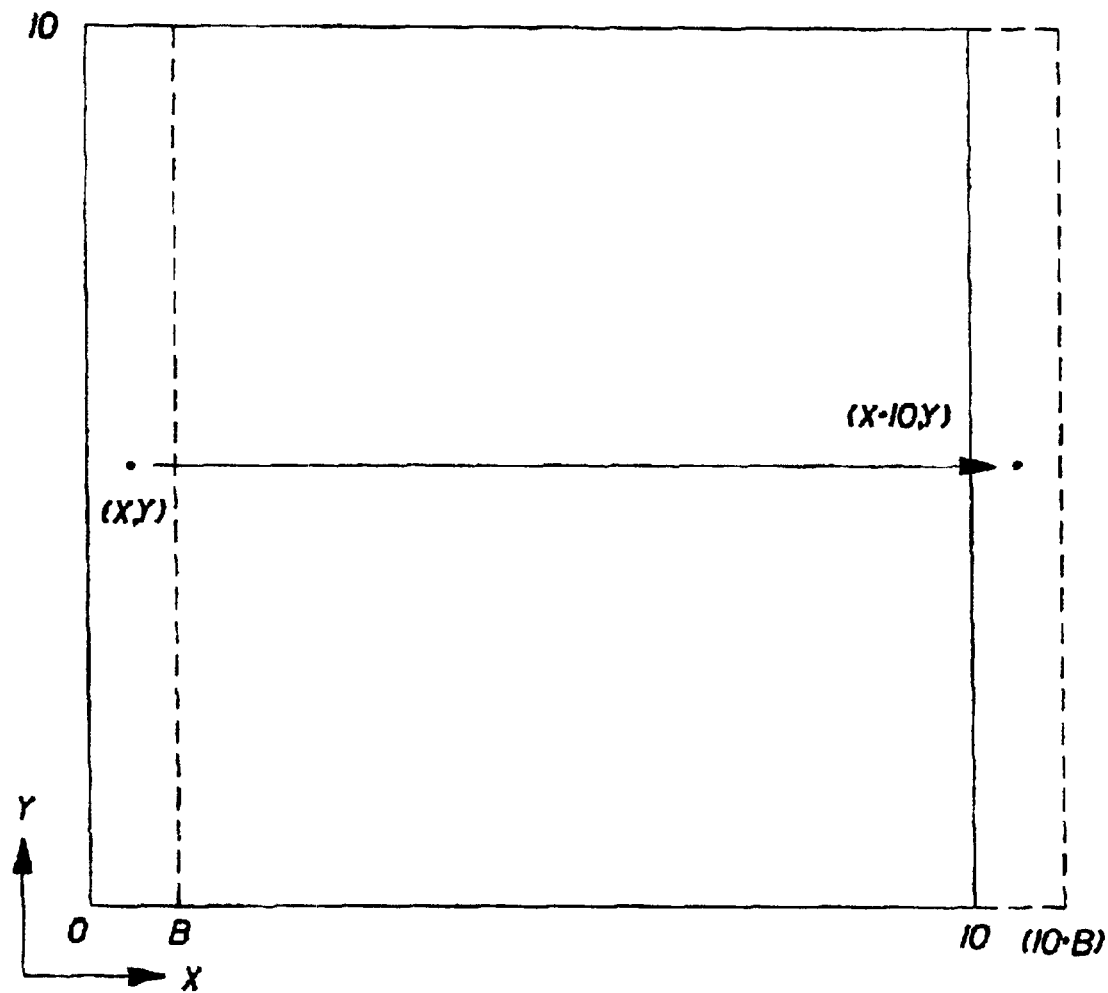
FIG. 7 is a schematic illustration of dimensions referenced in the pattern generation equations.

It is at this point, that the invention described herein differs from the pattern generation algorithm described in the previous McGuire et al. application. Assuming that it is desired to have the left and right edge of the pattern "mesh", i.e., be capable of being "tiled" together, a border of width B is added to the right side of the 10 inch (25.4 cm) square (see FIG. 7). The size of the required border is dependent upon the nucleation density; the higher the nucleation density, the smaller is the required border size. A convenient method of computing the border width, B, is to refer again to the hypothetical regular hexagon array described above and shown in FIG. 6. In general, at least three columns of hypothetical hexagons should be incorporated into the border, so the border width can be calculated as:

$$B = 3(D+H)$$

Now, any nucleation point P with coordinates (x,y) where x<B will be copied into the border as another nucleation point, P', with a new coordinate ($x_{max}$+x,y).

If the method described in the preceding paragraphs is utilized to generate a resulting pattern, the pattern will be truly random. This truly random pattern will, by its nature, have a large distribution of polygon sizes and shapes which may be undesirable in some instances. In order to provide some degree of control over the degree of randomness associated with the generation of "nucleation point" locations, a control factor or "constraint" is chosen and referred to hereafter as β (beta). The constraint limits the proximity of neighboring nucleation point locations through the introduction of an exclusion distance, E, which represents the minimum distance between any two adjacent nucleation points. The exclusion distance E is computed as follows:

$$E = \frac{2\beta}{\sqrt{\lambda\pi}}$$

where λ (lambda) is the number density of points (points per unit area) and β ranges from 0 to 1.

To implement the control of the "degree of randomness", the first nucleation point is placed as described above. β is then selected, and E is calculated from the above equation. Note that β, and thus E, will remain constant throughout the placement of nucleation points. For every subsequent nucleation point (x,y) coordinate that is generated, the distance from this point is computed to every other nucleation point that has already been placed. If this distance is less than E for any point, the newly-generated (x,y) coordinates are deleted and a new set is generated. This process is repeated until all N points have been successfully placed. Note that in the tiling algorithm useful in accordance with the present invention, for all points (x,y) where x<B, both the original point P and the copied point P' must be checked against all other points. If either P or P' is closer to any other point than E, then both P and P' are deleted, and a new set of random (x,y) coordinates is generated.

If β=0, then the exclusion distance is zero, and the pattern will be truly random. If β=1, the exclusion distance is equal to the nearest neighbor distance for a hexagonally close-packed array. Selecting β between 0 and 1 allows control over the "degree of randomness" between these two extremes.

In order to make the pattern a tile in which both the left and right edges tile properly and the top and bottom edges tile properly, borders will have to be used in both the X and Y directions.

Once the complete set of nucleation points are computed and stored, a Delaunay triangulation is performed as the precursor step to generating the finished polygonal pattern. The use of a Delaunay triangulation in this process constitutes a simpler but mathematically equivalent alternative to iteratively "growing" the polygons from the nucleation points simultaneously as circles, as described in the theoretical model above. The theme behind performing the triangulation is to generate sets of three nucleation points forming triangles, such that a circle constructed to pass through those three points will not include any other nucleation points within the circle. To perform the Delaunay triangulation, a computer program is written to assemble every possible combination of three nucleation points, with each nucleation point being assigned a unique number (integer) merely for identification purposes. The radius and center point coordinates are then calculated for a circle passing through each set of three triangularly-arranged points. The coordinate locations of each nucleation point not used to define the particular triangle are then compared with the coordinates of the circle (radius and center point) to determine whether any of the other nucleation points fall within the circle of the three points of interest. If the constructed circle for those three points passes the test (no other nucleation points falling within the circle), then the three point numbers, their X and Y coordinates, the radius of the circle, and the X and Y coordinates of the circle center are stored. If the constructed circle for those three points fails the test, no results are saved and the calculation progresses to the next set of three points.

Once the Delaunay triangulation has been completed, a Voronoi tessellation of 2-space is then performed to generate the finished polygons. To accomplish the tessellation, each nucleation point saved as being a vertex of a Delaunay triangle forms the center of a polygon. The outline of the polygon is then constructed by sequentially connecting the center points of the circumscribed circles of each of the Delaunay triangles, which include that vertex, sequentially in clockwise fashion. Saving these circle center points in a repetitive order such as clockwise enables the coordinates of the vertices of each polygon to be stored sequentially throughout the field of nucleation points. In generating the polygons, a comparison is made such that any triangle vertices at the boundaries of the pattern are omitted from the calculation since they will not define a complete polygon.

If it is desired for ease of tiling multiple copies of the same pattern together to form a larger pattern, the polygons generated as a result of nucleation points copied into the computational border may be retained as part of the pattern and overlapped with identical polygons in an adjacent pattern to aid in matching polygon spacing and registry. Alternatively, as shown in FIGS. 4 and 5, the polygons generated as a result of nucleation points copied into the computational border may be deleted after the triangulation and tessellation are performed such that adjacent patterns may be abutted with suitable polygon spacing.

Once a finished pattern of interlocking polygonal two-dimensional shapes is generated, in accordance with the present invention such a network of interlocking shapes is utilized as the design for one web surface of a web of material with the pattern defining the shapes of the bases of the three-dimensional, hollow protrusions formed from the initially planar web of starting material. In order to accomplish this formation of protrusions from an initially planar web of starting material, a suitable forming structure comprising a negative of the desired finished three-dimensional structure is created which the starting material is caused to conform to by exerting suitable forces sufficient to permanently deform the starting material.

From the completed data file of polygon vertex coordinates, a physical output such as a line drawing may be made of the finished pattern of polygons. This pattern may be utilized in conventional fashion as the input pattern for a metal screen etching process to form a three-dimensional forming structure. If a greater spacing between the polygons is desired, a computer program can be written to add one or more parallel lines to each polygon side to increase their width (and hence decrease the size of the polygons a corresponding amount).

EXAMPLE

A 5-gauge clear film, manufactured by Tredegar® Inc., was passed through a tension controller to a forming nip comprised of two 12 inch (30.5 cm) diameter rolls having 0.015 to 0.020 inches (0.38 to 0.51 mm) male and female patterns embossed and in register thereon. The rolls were engaged between 0.008 to 0.012 inches (0.20 to 0.31 mm) resulting in a 0.003 to 0.004 inch (0.076 to 0.102 mm) permanent deformation in the film.

The embossed film then exited the forming nip while maintaining contact and registration with the male roll as the male roll rotated toward the glue transfer nip. The glue transfer nip was a second female roll having a 0.0005 inch (0.013 mm) FEP release coating and an embossed pattern that is in register and had a 0.005 inch (0.13 mm) engagement with the male pattern roll. The second female roll had a 1.5 to 2.5 g/m$^2$ even distribution of styrenated block-copolymer hot melt adhesive. All three rolls were heated to 110° F. (43° C.).

The combined film/glue substrate was then pressed by a 4 inch (10 cm) diameter, rubber covered, 85A durometer, pressure roll that is pneumatically loaded to a one-fourth nip width. The film continued to a 2 inch (5 cm) diameter, rubber covered, 85A durometer peel-off roll having a 1/16 inch (0.16 cm) gap with the female roll and running from 1–10% faster than the female roll. The removed final product was then run through a chilling s-wrap system, a tension control dancer, and rewound onto a take-up core.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. An embossing and adhesive printing process, said process comprising the steps of:
    (a) supplying a first embossing roll having a first embossing pattern disposed thereon, wherein said first embossing roll as engaged with a second embossing roll, said second embossing roll having a second embossing pattern disposed thereon, said first embossing pattern and said second embossing pattern being complementary;
    (b) applying an adhesive to said first embossing roll;
    (c) contacting a web of sheet material with said first embossing roll after step (b), wherein said adhesive forms an adhesive pattern on said web of sheet material in register with said first embossing pattern of said first embossing roll; and,
    (d) passing said web of sheet material between said first embossing roll and said second embossing roll wherein said first embossing roll and said second embossing roll emboss said web with said complementary embossing pattern.

2. The process of claim 1, further comprising the steps of:
    (e) prior to step (b), applying said adhesive to a roll rotating at an initial tangential speed;
    (f) accelerating said adhesive through a series of metering gaps between a plurality of adjacent adhesive rolls;
    (g) applying said adhesive to an adhesive application roll rotating at a tangential line speed which is higher than said initial tangential speed; and,
    (h) transferring said adhesive from said adhesive application roll to said first embossing roll.

3. The process of claim 1, further comprising the steps of:
    (i) removing said web of sheet material from said first embossing roll.

4. The process of claim 3 wherein the temperature of said first embossing roll at step (i) is lower than the temperature of said first embossing roll at step (b).

5. The process of claim 1, further comprising the step of:
    (j) cooling said web of sheet material.

6. The process of claim 5 wherein said web of sheet material is cooled by cooling at least a portion of said first embossing roll.

7. The process of claim 6 wherein said first embossing roll is internally cooled.

8. The process of claim 6 wherein said first embossing roll further comprises a circumferential outer surface and wherein said outer surface is heated prior to step (b).

9. The process of claim 1, wherein said adhesive is selected from the group consisting of hot melt adhesives, pressure sensitive adhesives, water based adhesives, water borne adhesives, solvent based adhesives, ultra-violet cured adhesives, e-beam cured adhesives, and combinations thereof.

10. The process of claim 1, wherein either of said first embossing roll or said second embossing roll is heated.

11. The process of claim 1, wherein said first embossing roll is a female embossing roll and said second embossing roll is a male embossing roll.

12. The process of claim 1, wherein said first embossing roll is a male embossing roll and said second embossing roll is a female embossing roll.

13. The process of claim 1, wherein said first embossing roll includes a release surface.

14. The process of claim 1, wherein at least a portion of said first embossing roll is heated before step (b).

15. The process of claim 1 wherein said adhesive applied to said web of sheet material has a basis weight of less than 3 g/m$^2$.

16. The process of claim 1 wherein after step (c), cooling said web of sheet material.

17. An embossing and adhesive printing process, said process comprising the steps of:
    (a) supplying a first embossing roll with a first embossing pattern having lands and recesses disposed thereon, wherein said first embossing roll is engaged with a second embossing roll, said second embossing roll having a second embossing pattern disposed thereon, said first embossing pattern and said second embossing pattern being complementary;
    (b) passing a web of sheet material between said engagement of said first embossing roll and said second embossing roll wherein said first embossing roll and said second embossing roll emboss said web of sheet material with said complementary embossing pattern; and,
    (c) applying an adhesive to said sheet of web material after step (b), wherein said adhesive is applied into said recesses of said embossed sheet of web material.

18. The process of claim 17 wherein said adhesive is applied by an application roll having an adhesive printing pattern complementary to said first embossing pattern of said first embossing roll.

19. An adhesive coated sheet material which comprises:
    an adhesive deposited within each embossing roll having a first embossing pattern web of sheet material by supplying a first embossing roll having a first embossing pattern disposed thereon, wherein said first embossing roll is engaged with a second embossing roll, said second embossing roll having a second embossing pattern disposed thereon, said first embossing pattern and said second embossing pattern being complementary, applying said adhesive to said first embossing roll, contacting said web of sheet material with said first embossing roll, wherein said adhesive forms an adhesive pattern on said web of sheet material in register with said first embossing pattern of said first embossing roll, and, passing said web of sheet material between said first embossing roll and said second embossing roll wherein said first embossing roll and said second embossing roll emboss said web with said complementary embossing pattern.

* * * * *